United States Patent [19]
Henry

[11] Patent Number: 5,995,990
[45] Date of Patent: *Nov. 30, 1999

[54] INTEGRATED CIRCUIT DISCRETE INTEGRAL TRANSFORM IMPLEMENTATION

[75] Inventor: Michel Henry, Le Fontanil, France

[73] Assignee: SGS-Thomson Microelectronics, S.A., Saint Genis, France

[ * ] Notice: This patent issued on a continued prosecution application filed under 37 CFR 1.53(d), and is subject to the twenty year patent term provisions of 35 U.S.C. 154(a)(2).

[21] Appl. No.: 07/954,542

[22] Filed: Sep. 29, 1992

[30] Foreign Application Priority Data

Sep. 30, 1991 [FR] France .................................. 91 12277

[51] Int. Cl.$^6$ ...................................................... G06F 17/14
[52] U.S. Cl. ........................................................... 708/402
[58] Field of Search ............................. 364/725; 708/402

[56] References Cited

U.S. PATENT DOCUMENTS

| 4,831,574 | 5/1989 | Duhamel ................................ 364/725 |
| 4,837,724 | 6/1989 | Borgers et al. ......................... 364/725 |
| 5,053,985 | 10/1991 | Friedlander et al. .................... 364/725 |

OTHER PUBLICATIONS

Proceedings of the 1990 IEEE Int. Symp. on Circuits & Systems, vol. 2/4, May 1, 1990, pp. 1620–1623, "Discrete Cosine Transform Chip for Real–Time Video Applications". Proceedings of TECNON 87 "Computers & Communications Technology Toward 2000", IEEE Comp. Society Press, New York, US, vol. 2/3, Aug. 25, 1987, pp. 595–599, "A Universal Real–Time Transformer for Image Coding".

Proceedings of the 1990 Int. Symposium on Circuits & Systems, IEEE Comp. Soc. Press, vol. 3/4, May 1, 1990, pp. 2373–2376, "A New Convolution Structure for the Realization of the Discrete Cosine Transform".

*Primary Examiner*—David H. Malzahn
*Attorney, Agent, or Firm*—Wolf, Greenfield Sacks, P.C.

[57] ABSTRACT

An integrated circuit data processing structure and method for performing a discrete cosine transform (DCT) makes the correspondence between a table f(x,y) of N×N data and a table F(u,v) of N×N coefficients according to the following relation:

$$F(u, v) = (1/K) \sum_{x=0}^{N-1} \sum_{y=0}^{N-1} f(x, y) \cdot p(x, u) \cdot p(y, v).$$

The innovative structure uses:
- a memory containing a data table;
- a memory of the products
  $P = |\cos[n(x,u)\pi/2N] \cdot \cos[n(y,v)\pi/2N]|$, with:
    $p(x,u) = \text{Sgn}[p(x,u)] \cdot |\cos[n(x,u)\pi/2N]|$
    $p(y,v) = \text{Sgn}[p(y,v)] \cdot |\cos[n(y,v)\pi/2N]|$
  where n(x,u) and n(y,v) are integers ranging from 1 to N−1;
- a table of the signs of p(x,u) and p(y,v) and values of n(x,u) and n(y,v) addressing the product memory (3);
- a coordinate generator sequentially providing value pair (u,v) and, for each pair (u,v), all the values of pair (x,y);
- a multiplier calculating the product of P by a data combination of the data memory; and
- an accumulator of the results of the multiplication.

20 Claims, 4 Drawing Sheets

| u<br>x | 0 | 1 | 2 | 3 | 4 | 5 | 6 | 7 |
|---|---|---|---|---|---|---|---|---|
| 0 | 4+ | 1+ | 2+ | 3+ | 4+ | 5+ | 6+ | 7+ |
| 1 | 4+ | 3+ | 6+ | 7− | 4− | 1− | 2− | 5− |
| 2 | 4+ | 5+ | 6− | 1− | 4− | 7+ | 2+ | 3+ |
| 3 | 4+ | 7+ | 2− | 5− | 4+ | 3+ | 6− | 1− |

INTEGRATED CIRCUIT DISCRETE INTEGRAL TRANSFORM IMPLEMENTATION

BACKGROUND AND SUMMARY OF THE INVENTION

The present invention relates to a method and a circuit for digital signal processing to achieve a so-called "Discrete Cosine Transform" (DCT).

In general, an integral transform provides a way to reversibly transform one function (or set of data) into another function. (See generally, e.g., Arfken, MATHEMATICAL METHODS FOR PHYSICISTS (2.ed. 1970); Bateman et al., TABLES OF INTEGRAL TRANSFORMS (1954); both of which are hereby incorporated by reference.) Integral transforms are a fundamental tool of applied mathematics, but typically require a large amount of calculation to implement in practice. Thus, digital implementations of integral transforms have been intensively studied. (See generally, e.g., R. Hamming, NUMERICAL METHODS FOR SCIENTISTS AND ENGINEERS (2.ed. 1973), which is hereby incorporated by reference. A digital implementation of an integral transform is necessarily "discrete," i.e. is applied to data points which are separated by some finite interval, as opposed to the continuous transformations implied by the original equations of abstract integral transforms. Integral transforms may transform a one-dimensional data array to a one-dimensional coefficient array, or may be used to relate two-dimensional data and coefficient arrays. Of course, the transforms most useful for image and video applications are typically two-dimensional or higher.)

Interest in efficient computation accelerated greatly after the publication of various Fast Fourier Transform (FFT) procedures in the 1960s and 1970s. (See generally, e.g., Cooley & Tukey, "An Algorithm for the Machine Calculation of Complex Fourier Series," 19 MATH. COMPUT. 297 (1965), and papers citing this paper, all of which are hereby incorporated by reference.)

Integral transforms are especially attractive for compression and analysis of image and video data. For video compression and coding, the objective is to filter out "inessential" image data. Human visual perception does not make use of the full bandwidth of video images, so that, in principle, it should be possible to achieve a very large reduction in image data with very slight reduction in perceived quality. Reduction in data volume leads to substantial product advantages, such as faster transmission and smaller storage requirements for video images, and/or use of lower-bandwidth channels for transmission of images. However, it is not easy to achieve such compression by simple filtering of the image. The attraction of integral transform operations is that, by defining a suitable transform operation, it may be possible to perform a simple filtering operation in the transform domain (i.e. on the transformed data) which will achieve large data compression with minimal degradation of perceived quality. Similarly, for image recognition and understanding problems, it is desirable to find a transform domain where the "essential" features of the image can be efficiently filtered for rapid comparison with recognition templates. General background discussion may be found, for example, in Rosenfeld & Kak, DIGITAL PICTURE PROCESSING (2.ed. 1982); Rabiner & Gold, THEORY AND APPLICATIONS OF DIGITAL SIGNAL PROCESSING (1975); PICTURE PROCESSING AND DIGITAL FILTERING (2.ed. Huang 1979); all of which are hereby incorporated by reference.

In particular, it has been suggested that the Discrete Cosine Transform (DCT) may be particularly advantageous for image transformation. See Ahmed et al., "Discrete Cosine Transform," 23 IEEE TRANS'NS ON COMPUTERS 90 (January 1974); Kamangar et al., "Fast Algorithms for the 2-D Discrete Cosine Transform," 31 IEEE TRANS'NS ON COMPUTERS 899 (September 1982). These and other articles of interest are collected in DIGITAL IMAGE PROCESSING AND ANALYSIS (ed. Chellappa & Sawchuk 1985), which is hereby incorporated by reference in its entirety.

This type of transformation makes the correspondence between a matrix (or block) of digital input values and a matrix of digital output values (or coefficients). (The term "coefficients" will be frequently used, in the present application, for the transformed data. This terminology is intended to help prevent confusion between the image data set and the transformed data set. This transformation is particularly useful for compressing images to be transmitted at a higher rate than the rate that would be possible if the corresponding signals were transmitted without transformation.) The cosine transform of itself does not achieve any data compression; the compression is performed by an encoder positioned downstream of the transformation circuit. However, the transformation circuit makes compression easier, by feeding the encoder transformed data that can be safely compressed. Such transformation circuits are particularly useful for digital transmission of black and white or color images, and the preferred embodiment will be described with reference to such applications. Thus, the matrix of digital input values will correspond to a pixel matrix. (Normal video image formats are closely related to the operation of a raster-scanned cathode-ray tube. Thus, a video image includes a long series of successive frames (possibly accompanied by audio or character data at a low data rate). Each frame includes multiple lines of image data, and each line includes a fixed number of pixels. (In analog images, it is more accurate to speak of a maximum number of pixels, since the actual information content of the image will be affected by the image degradation during transmission and reception.) The gray level of each pixel, and its color components, will be specified by a bit resolution which varies widely, depending on the format used. For example, a black and white character display needs only 1 bit per pixel, but a "true-color" display uses 24 bits per pixel. The frame rate is chosen to be high enough to reduce flicker. For example, the NTSC television standard provides an apparent frame rate of 60 Hz; but this is achieved by transmitting interlaced half-frames alternately, so that the true frame rate is about 30 frames per second.)

The cosine transform is preferably performed block-by-block, and not on the whole image plane at once. That is, to achieve the cosine transform, the image (or frame) to be transmitted is arranged into blocks of pixels, e.g. the $N^2$ pixels in an area of N rows and N columns. Each pixel in each block is represented by a digital value, for example a 8-bit coded value. This value corresponds, for example, to the luminance and/or chrominance components of a pixel. Partitioning the image in this fashion vastly reduces the volume of calculations which must be performed.

The cosine transform makes the correspondence between the block of N×N pixels and a block of N×N coefficients. The value of the pixel having coordinates x and y in the block is called $f(x,y)$. $F(u,v)$ designates the coefficient calculated according to the cosine transform and positioned at the intersection of line u and column v in the transformed block. In the most usual case, N=8, so that x, y, u and v will range from 0 to 7.

In the following description, only this specific example of 8×8 pixel blocks will be considered. Those skilled in the art will be able to easily calculate or find in specialized literature corresponding formulas for N×N pixel blocks. Thus, in the specific example considered, a cosine transform is disclosed by the following relation:

$$F(u, v) = (1/K) \sum_{x=0}^{7} \sum_{y=0}^{7} f(x, y) \cdot c(u) \cdot \cos\left[(2x+1)u\frac{\pi}{16}\right] \cdot \quad (1)$$

$$c(v) \cdot \cos\left[(2y+1)v\frac{\pi}{16}\right]$$

In this formula:
K is a standardization coefficient which is expressed as an integral power of 2;
x,y are spatial coordinates of a pixel of the initial block;
u,v are coordinates of a coefficient of the transformed block;
f(x,y) is the value of a pixel of the initial block;
F(u,v) is the value of a coefficient of the cosine transform;
c(u), c(v)=1/√2 for u,v=0, and
c(u), c(v)=1 for u,v≠0.

The calculation power required for DCT operation depends upon the number of blocks to be processed per second. For conventional or high definition TV images, several hundreds of kiloblocks must be processed per second; to achieve this purpose, one resorts to specialized integrated circuits implementing complex algorithm functions, such as the Byong Gi Lee algorithm. These circuits can achieve very fast processing operations, but unfortunately require numerous components to simultaneously achieve various operations. Such circuits therefore occupy a large surface on an integrated circuit, and are expensive.

Transform operations are also commonly needed at lower data rates, for example for processing images of the videophone type, for which processing of approximately 10 kiloblocks/second seems to be sufficient.

Thus, an object of the invention is to provide a method and a circuit for processing data through discrete cosine transform that can be achieved in the form of a small-size integrated circuit.

To achieve this object, the invention provides a DCT data processing method making the correspondence between an N×N table f(x,y) of data and an N×N table F(u,v) of coefficients according to the following relation:

$$F(u, v) = (1/K) \sum_{x=0}^{N-1} \sum_{y=0}^{N-1} f(x, y) \cdot p(x, u) \cdot p(y, v) \quad (2)$$

where
K is a constant power of 2,
x,y designate the coordinates of a datum in the data table,
u,v designate the coordinates of a coefficient in the coefficient table,
p(x,u)=c(u)·cos[(2x+1)uπ/2N]
p(y,v)=c(v)·cos[(2y+1)vπ/2N]
c(u), c(v)=1/√2 for u,v=0, and c(u), c(v)=1 for u,v≠0.

This method is preferably, but not necessarily, implemented in a single integrated circuit.

The innovative method sequentially determines each coefficient F(u,v) for a coordinate pair (u,v) by performing the following steps:

for a first pair x,y, searching in a table for the absolute value and the sign of coefficient P=p(x,u)·p(y,v);

multiplying the absolute value of P by f(x,y);

introducing the result of the multiplication by addition or subtraction (depending on the sign) in an accumulator;

repeating the operation for all the values of the pair x,y; and extracting the result provided by the accumulator.

According to an embodiment of the invention, the step of searching in a table is achieved as follows:

searching in a first table, addressed by x and u, for the sign of p(x,u) and the value of an integer term n(x,u) (ranging from 1 to N−1), with:
p(x,u)=Sgn[p(x,u)]·|cos[n(x,u)π/2N]|;

searching in a second table, addressed by y and v, for the sign of p(y,v) and the value of an integer term n(y,v) (ranging from 1 to n−1), with
p(y,v)=Sgn[p(y,v)]·|cos[n(y,v)π/2N]|; and searching in a third table addressed by n(x,u) and n(y,v) for the absolute value of coefficient P.

Another aspect of this method is to sequentially determine each coefficient F(u,v) by performing the following steps:

for four pairs x,y (corresponding to positions symmetrical by pairs with respect to central axes of the data table), searching in a table for the absolute value of coefficient P=p(x,u)·p(y,v);

combining by addition and/or subtraction, for these four pairs, the values of the corresponding data, the sign of each operation being determined as a function of the relative position of the four data;

multiplying the combined value by the value of coefficient P;

introducing the result of the multiplication into the accumulator; and repeating the operation for all pairs x,y with x and y ranging from 0 to (N/2)−1.

According to another approach, the invention provides a method for DCT processing of a block of N×N data points (f(x,y)) stored in a memory, where each location of the block corresponds to coordinates x,y, to provide a coefficient (F(u,v)) of a block of coefficients, the method comprising the following steps:

addressing a location in the memory;

providing the content of the location to a first input of a multiplier;

storing in a first table, for all the values of the parameters n(x,u) and n(y,v) ranging from 1 to N−1, the values of $$P = \cos\left[n(x, u)\frac{\pi}{2N}\right] \cdot \cos\left[n(y, v)\frac{\pi}{2N}\right];$$

storing in second tables the values of the sign of the cosine functions as a function of the values of u and x, on the one hand and, v and y, on the other, as well as the values of n(x,u) and n(y,v) and using these values for addressing the first table;

multiplying at each clock pulse a value of a location of the data block by a value of the first table; and cumulating the result of the multiplications by addition or subtraction as a function of the signs determined by the second tables for all the values of x and y.

Another innovative teaching disclosed herein is a DCT data processing circuit, for making the correspondence between a table f(x,y) of N×N data and a table F(u,v) of N×N coefficients, which include:

a data table memory;

a memory of the products $$P = \left|\cos\left[n(x, u)\frac{\pi}{2N}\right] \cdot \cos\left[n(y, v)\frac{\pi}{2N}\right]\right|,$$

where $$p(x, u) = \text{Sgn}[p(x, u)] \cdot \left|\cos\left[n(x, u)\frac{\pi}{2N}\right]\right|,$$

$$p(y, v) = \text{Sgn}[p(y, v)] \cdot \left|\cos\left[n(y, v)\frac{\pi}{2N}\right]\right|,$$

and n(x,u) and n(y,v) are integers ranging from 1 to N−1;

a table of the signs of p(x,u) and p(y,v) and values of n(x,u) and n(y,v) addressing the product memory;

a coordinate generator sequentially providing value pair (u,v) and, for each pair (u,v), all the values of pair (x,y);

a multiplier calculating the product of P by a data combination of the data memory; and a totalizer subtracting or adding the result of the multiplication with the previous results as a function of the sign provided by the sign table.

Reciprocally, the disclosed innovations also provide a circuit for processing coefficients through reverse discrete cosine transform making the correspondence between a table of N×N coefficients (F(u,v)) and a table of N×N data (f(x,y)) according to the following relation:

$$f(x, y) = (1/K) \sum_u \sum_v F(u, v) \cdot c(u) \cdot \cos\left[(2x + 1)\frac{u\pi}{16}\right] \cdot c(v) \cdot \cos\left[(2y + 1)\frac{v\pi}{16}\right]$$

where

K is a constant power of 2, x,y designate the coordinates of a datum in the data table, u,v designate the coordinates of a coefficient in the coefficient table, c(u), c(v)=1/√2 for u,v=0 and c(u), c(v)=1 for u,v≠0.

This circuit comprises:

a memory of the coefficient table;

a memory of the products P=cos[n(x,u) π/2N]·cos[n(y,v) π/2N], where n(x,u) and n(y,v) are integers ranging from 1 to (N/2)−1;

a table of the signs of cos[n(x,u)π/2N] and cos[n(y,v)π/2N] and of n(x,u) and n(y,v);

a coordinate generator sequentially providing a pair of values (x,y) corresponding to the first quadrant of the data table as well as signals par(u) and par(v) equal to +1 or −1 depending on whether u and v are even or odd, and, for each pair (x,y), all the values of pair (u,v);

a multiplier calculating the product of P by a coefficient combination of the coefficient memory; and four totalizers subtracting or adding the result of the multiplication from or to the previous results as a function of the sign provided by the sign table and the values of par(u) and par(v) for respectively providing f(x,y), f(x',y), f(x,y') and f(x',y') where x'=N−1−x and y'=N−1−y.

The disclosed innovations provide a particularly advantageous implementation of a videophone codec, wherein the Discrete DCT and the reverse DCT are performed on a single videocodec chip. The disclosed innovations help to provide a compact implementation of these functions at relatively low cost.

BRIEF DESCRIPTION OF THE DRAWING

The present invention will be described with reference to the accompanying drawings, which show important sample embodiments of the invention and which are incorporated in the specification hereof by reference, wherein.

DESCRIPTION OF THE PREFERRED EMBODIMENTS

Figure 1:
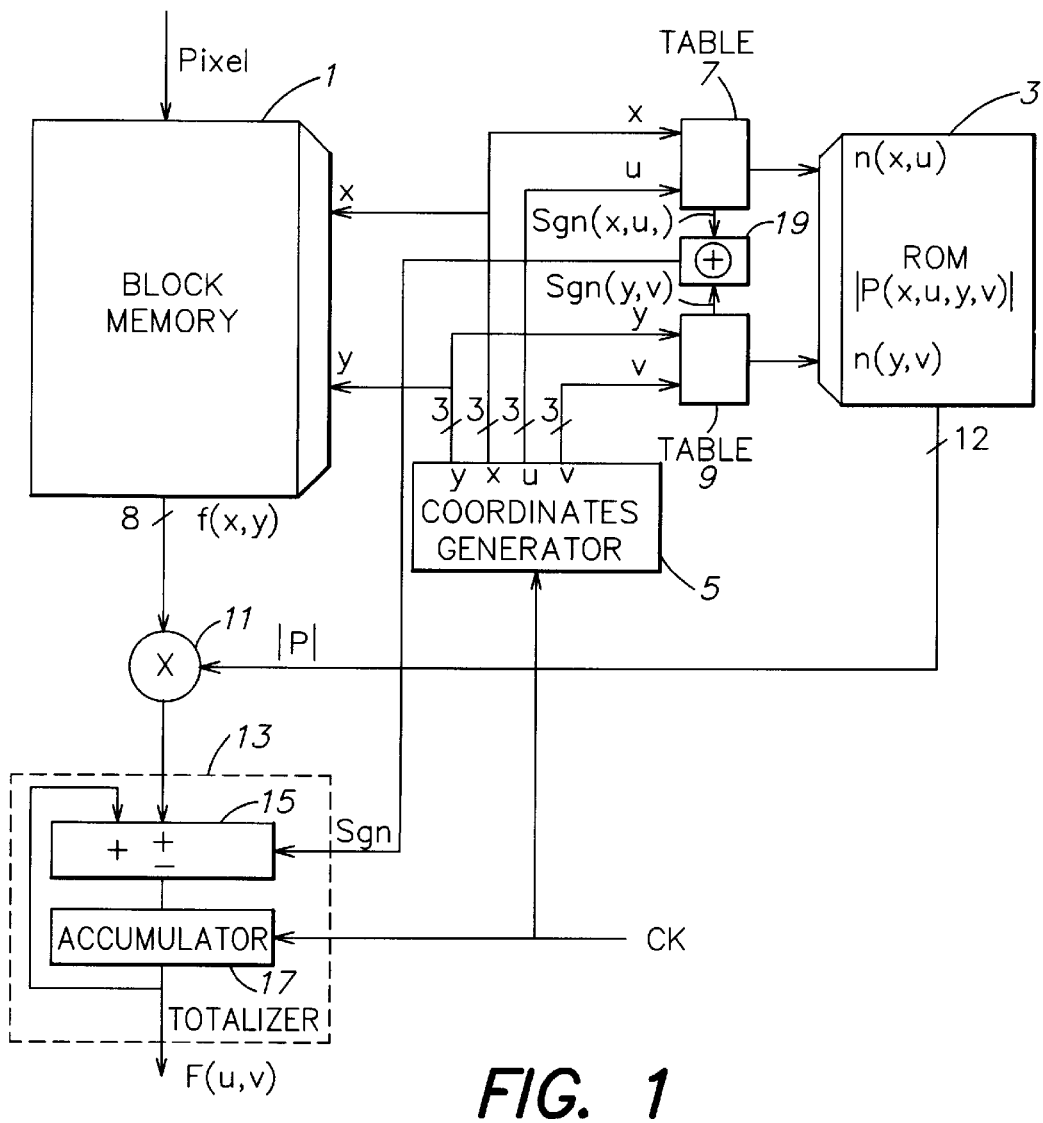
FIG. 1 shows a first embodiment of the invention.

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Innovative Methods

The presently preferred embodiment employs an innovative analysis and decomposition of the basic DCT formula (1). In the prior art, the methods and circuits used for implementing these methods essentially aimed at simultaneously achieving the greatest possible number of operations, at the expense of an increasingly high number of electronic components. By contrast, the disclosed innovations provide an implementation which achieves these functions in series in the simplest possible way, using fewer electronic components, while providing sufficient calculating power for processing image sequences of tens of kiloblocks per second.

The above equation (1) can be re-written as:

$$F(u, v) = 1/K \sum_x \sum_y f(x, y) \cdot P(x, u, y, v) \qquad (8)$$

where P(x,u,y,v)=p(x,u)p(y,v), with $$p(x, u) = c(u) \cdot \cos\left[(2x + 1)\frac{u\pi}{16}\right] \qquad (9)$$

$$= \text{Sgn}[p(x, u)] \cdot \left|\cos\left[n(x, u)\frac{\pi}{16}\right]\right|,$$

-continued $$p(y, v) = c(v) \cdot \cos\left[(2y + 1)\frac{v\pi}{16}\right] \quad (10)$$

$$= \text{Sgn}[p(y, v)] \cdot \left|\cos\left[n(y, v)\frac{\pi}{16}\right]\right|,$$

where n(x,u) or n(y,v) are integers, limited to the range from 1 to 7, which preserve the foregoing relationships, and Sgn[p(x,u)] or Sgn[p(y,v)]=±1 designates the sign of p.
In these formulas:
  if u=0, the cosine is equal to 1 and p(x,u)=c(u)=1/√2=cos 4π/16,
  if u≠0, c(u)=1 and p(x,u)=cos[(2x+1)uπ/16].
The same applies for c(v) and p(y,v).

This means that p(x,u) or p(y,v) is always equal to the absolute value of the cosine of an arc of the first quadrant multiple of π/16, with a positive or negative sign. Hence, each value of F(u,v) corresponds to the sum of 64 products of f(x,y) by a coefficient P of the type $$\left|\cos\left[n(x, u)\frac{\pi}{16}\right] \cdot \cos\left[n(y, v)\frac{\pi}{16}\right]\right|$$

having a positive or negative sign. The absolute value |P| can assume 49 different values.

The presently preferred embodiment uses tables to store the sign and the absolute value of each product cos[n(x,u)π/16]·cos[n(y,v)π/16] to serve as a basis for the DCT processing. More particularly, the invention provides to use in a first memory two tables, one of which receives the current value of x and u and provides n(x,u) and Sgn(x,u), and other of which receives the current value of y and v and provides n(y,v) and Sgn(y,v). The values of n(x,u) and n(y,v) then jointly serve as an address for a second memory containing the absolute values of P (cosine products). Referring back to the above formulas, it will be noted that, in the specific example of 8×8 blocks, tables have relatively small sizes (64 4-bit words for each of the first tables, and 49 words of typically 12 bits for the second memory).

Innovative Circuit Implementation

FIG. 1 is a block drawing representing a first DCT circuit embodiment according to the invention.

The pixels of block x,y to be processed are stored in a memory 1 which initially contains the 64 pixels of the 8×8 block to be processed. In practice, in order to avoid waste of time during storage of the next block, it is advisable to use a dual-port memory, with twice the minimum size, for double-buffering. While one block is being processed, the next one will be simultaneously loaded, according to prior art techniques.

A Read Only Memory (ROM) 3 contains all products $$P = |P(x, u, y, v)| = \left|\cos\left[n(x, u)\frac{\pi}{16}\right] \cdot \cos\left[n(y, v)\frac{\pi}{16}\right]\right|,$$

i.e. 49 coefficients.
A coordinate generator sequentially provides the 64 possible combinations of the values of u and v and, for each pair (u,v), scans within 64 clock pulses the 64 possible values of x,y, that is, the 64 memory pixels of block 1. It will be noted that coordinates x,y are scanned randomly, but that the scanning order of pair (u,v) is chosen as a function of the order to be obtained at the circuit output. For example, if it is desired to provide an output complying with the CCITT H261 standard requirements, scanning of the (u,v) matrix will be performed in a zigzag pattern.

For each pair (x,u), a table 7 provides the corresponding value of the sign of p(x,u) (Sgn[p(x,u)], hereafter abbreviated as "Sgn(x,u)"). This table also provides the half address n(x,u) for addressing the memory 3. A table 9 achieves similar functions for y and v.

For each pair (x,y), a multiplier 11 provides the product by P of the value f(x,y) of the current pixel. This product is provided to a totalizer 13, which, every 64 clock pulses, provides a coefficient value F(u,v) for one of the pairs (u,v). Totalizer 13 includes an adder-subtractor 15 and an accumulator 17. Accumulator 17 stores during 64 clock pulses the algebraic sum of the outputs of adder 15. The adder receives at a first input the partial result accumulated in accumulator 17 and at its second input the current product P·f(x,y), having the sign (+) or (−) depending on the output of a sign determination circuit 19, which provides the algebraic product of Sgn(x,u) and Sgn(y,v) obtained at the outputs of tables 7 and 9.

With the circuit of FIG. 1, 64 clock pulses are necessary to calculate each coefficient F(u,v) and therefore 64·64=4096 clock pulses are needed for calculating the 64 DCT coefficients of a block. In the circuit of FIG. 1, the element having the slowest operation rate is multiplier 11. A technology which enables making one multiplication within a 16-MHz clock pulse allows a calculating power of approximately 4 kiloblocks/second.

To obtain a more accurate approximation of the size of the circuit of FIG. 1, it may be noted that, for a 8×8 block, the coordinate generator provides each coordinate in 3 bits, and, if the pixels of the block memory are defined with 8 bits of precision, then the value of P must be defined to 12 bits in order not to impair the data resolution.

Alternative Innovative Circuit with Wide Multipler

In a second embodiment of the invention, the rate at which coefficients F(u,v) are delivered is increased, by using a single multiplier which multiplies a 11-bit number by a 12-bit number within a 16-MHz clock pulse. To achieve this purpose, a more accurate analysis of coefficients p is taken into account. It is then possible to note that these coefficients meet the following characteristic feature: Let x'=7−x; then p(x',u)=p(x,u) if u is even, and −p(x,u) if u is odd. Using the notation par(u) to designate the parity of u (par(0)=1, par(1)=−1), this expression can be written: p(x',u)=par(u)·p(x,u). Using this notation, equation (1) can now be rewritten as:

$$F(u, v) = \frac{1}{K} \sum_{x=0}^{\frac{N}{2}-1} \sum_{y=0}^{\frac{N}{2}-1} P(u, x, v, y)[f(x, y) + \quad (13)$$

$$\text{par}(u)f(x', y) + \text{par}(v)f(x, y') + \text{par}(u)\text{par}(v)f(x', y')]$$

Figure 2:
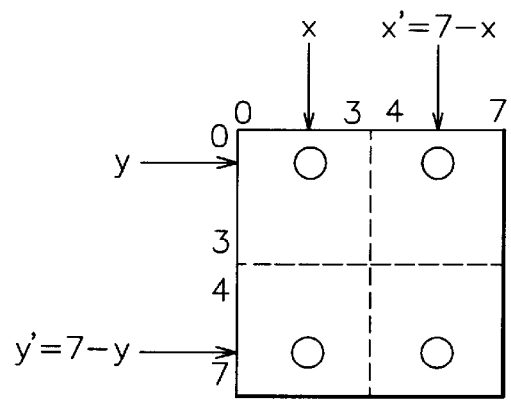
FIG. 2 is an exemplary block drawing useful for understanding the method implemented in the second embodiment of the invention.

As shown in FIG. 2, this expression means that, for four pixels symmetrical with respect to the central axes of the table of pixels (x,y), that is, for pixels (x,y), (x',y), (x,y'), and (x',y'), the multiplying coefficient P will be the same, provided that the data corresponding to the pixels are given a positive or negative sign as a function of their position. However, the double sum ranges over 4×4=16 terms only, instead of 8×8=64 as in the first embodiment described above. As a result of this, the size of memories 7 and 9 of FIG. 1 can be decreased, and a coefficient F(u,v) can be calculated within 16 clock pulses only instead of 64. Thus, the calculation rate is four times faster and provides rates of approximately 16 kiloblocks/second, that is, a rate fast enough to process videophone data, as above indicated.

Figures 3, 4:
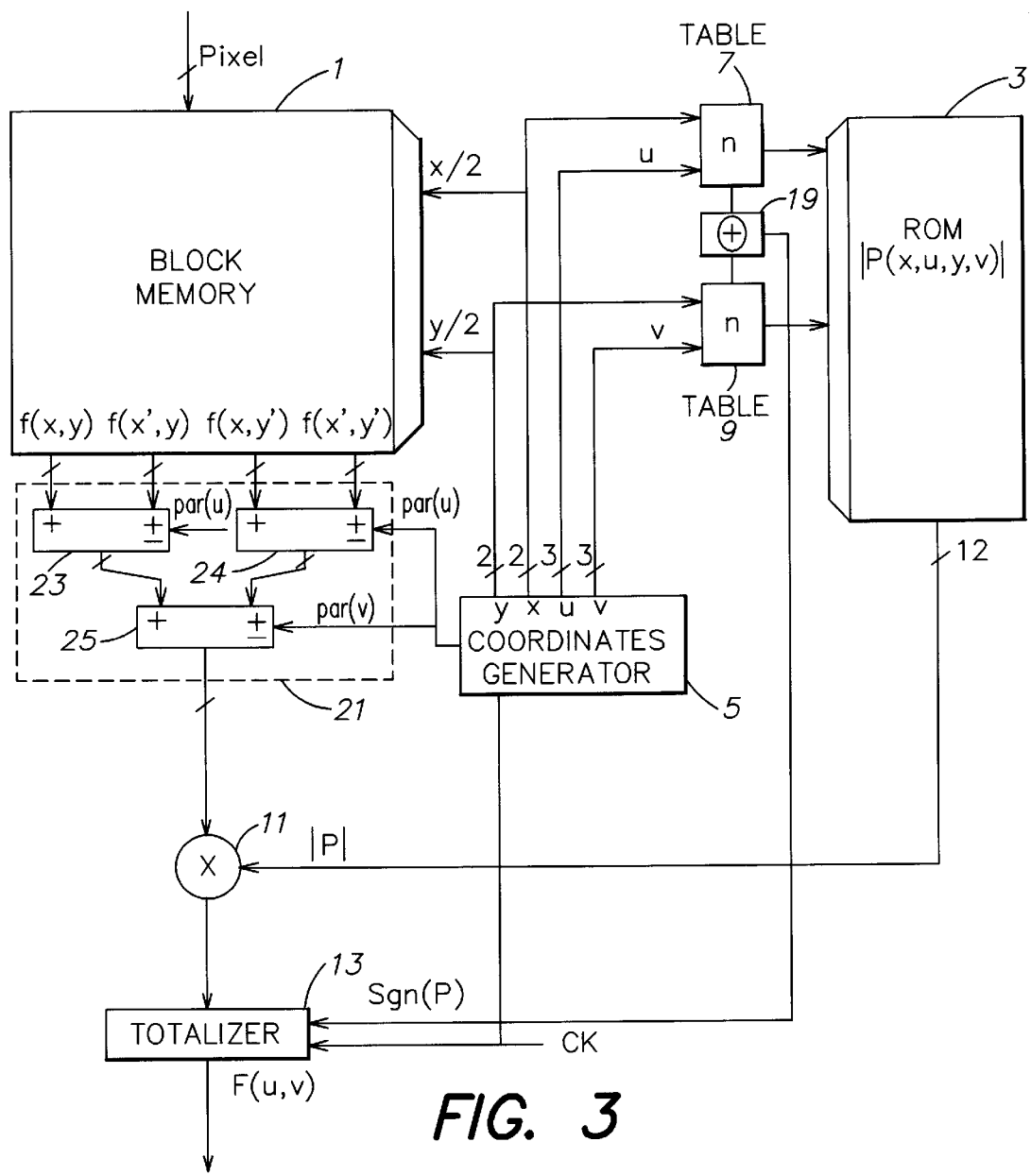
FIG. 3 shows a second embodiment of the invention.
FIG. 4 is a table of the coefficient values for various values of u and x.

FIG. 3 schematically shows a circuit implementing the second embodiment of the invention. Like the circuit of FIG.

1, the circuit of FIG. 3 comprises a block memory 1, a memory 3 of coefficients P, a data generator 5, tables 7 and 9 providing values n(x,u) and n(y,v), respectively, for addressing ROM 3 and also providing the signs of p(x,u) and p(y,v) to a circuit 19 which provides the sign of P. The absolute value of P is provided to a multiplier 11, the output of which is connected to a totalizer 13 which periodically provides successive values F(u,v).

An important difference from the circuit of FIG. 1 is that the coordinate generator 5 simultaneously addresses four pixels in memory 1, namely pixels f(x,y), f(x',y), f(x,y') and f(x',y'). A summation circuit 21 provides the value of $$f(x,y)+par(u)f(x',y)+par(v)[(f(x,y')+par(u)f(x',y')].$$

The output of circuit 21 is provided to the second input of multiplier 11.

In the described embodiment, the summation circuit 21 comprises three adder/subtractors. The first one, 23, provides an output f(x,y)+par(u)·f(x',y), and receives the input par(u) from the coordinate generator 5. Similarly, the second one, 24, provides an output f(x,y')+par(u)·f(x',y') and receives the input par(u) from the coordinate generator 5. The third one, 25, receives the signal par(v) from coordinate generator 5, and provides the final result.

In this embodiment, for each pair of values (u,v), only four values of y and four values of x are scanned, which increases the operating speed (but requires the addition of summation circuit 21). However, since circuit 21 only comprises adders, it is particularly simple to manufacture and will occupy a small surface on an integrated circuit.

For a better understanding of the invention, FIG. 4 shows the table of values of n(x,u) and Sgn(x,u) corresponding to each of the eight values of u and the four scanned values of x. (Note that n has been defined in formulas (9) and (10) above).

Reverse Discrete Cosine Transform

The reverse discrete cosine transform, for 8×8 blocks, is:

$$f(x, y) = \frac{1}{K}\sum_u \sum_v F(u, v) \cdot c(u) \cdot \cos\left[(2x + 1)\frac{u\pi}{16}\right] \cdot c(v) \cdot \cos\left[(2y + 1)\frac{v\pi}{16}\right].$$

This equation has the same form as equation (1) for determining the direct DCT. Thus, the circuit of FIG. 1 enables, without modification, calculating a reverse DCT, by interchanging f(x,y) and F(u,v).

The faster circuit of FIG. 3 takes advantage of a factorization of coefficient P which is not reversible. However, a corresponding structure for accelerating by a factor 4 the operation of the circuit with respect to the circuit of FIG. 1 can be adapted to the calculation of the reverse DCT.

Indeed, it can be noted that the same product $$F(u,v) \cdot p(x,u) \cdot p(y,v)$$

is included, except for its sign, in the calculation of the sum of 4 pixels. In other words, the processor of the reverse discrete cosine transform can simultaneously calculate four pixels within 64 clock pulses to have the same performances as the direct DCT calculator. Using, as above, the notation x'=7−x and y'=7−y, the following relations are obtained:

$$f(x, y) = \frac{1}{K}\sum_u \sum_v \mathrm{Sgn}(x, u, y, v) \cdot F(u, v) \cdot |P(x, u, y, v)| \quad (17)$$

$$f(x', y) = \frac{1}{K}\sum_u \sum_v \mathrm{par}(u) \cdot \mathrm{Sgn}(x, u, y, v) \cdot F(u, v) \cdot |P(x, u, y, v)| \quad (18)$$

$$f(x, y') = \frac{1}{K}\sum_u \sum_v \mathrm{par}(v) \cdot \mathrm{Sgn}(x, u, y, v) \cdot F(u, v) \cdot |P(x, u, y, v)| \quad (19)$$

$$f(x', y') = \frac{1}{K}\sum_u \sum_v \mathrm{par}(u) \cdot \mathrm{par}(v) \cdot \mathrm{Sgn}(x, u, y, v) \cdot F(u, v) \cdot |P(x, u, y, v)|.$$

Figure 5:
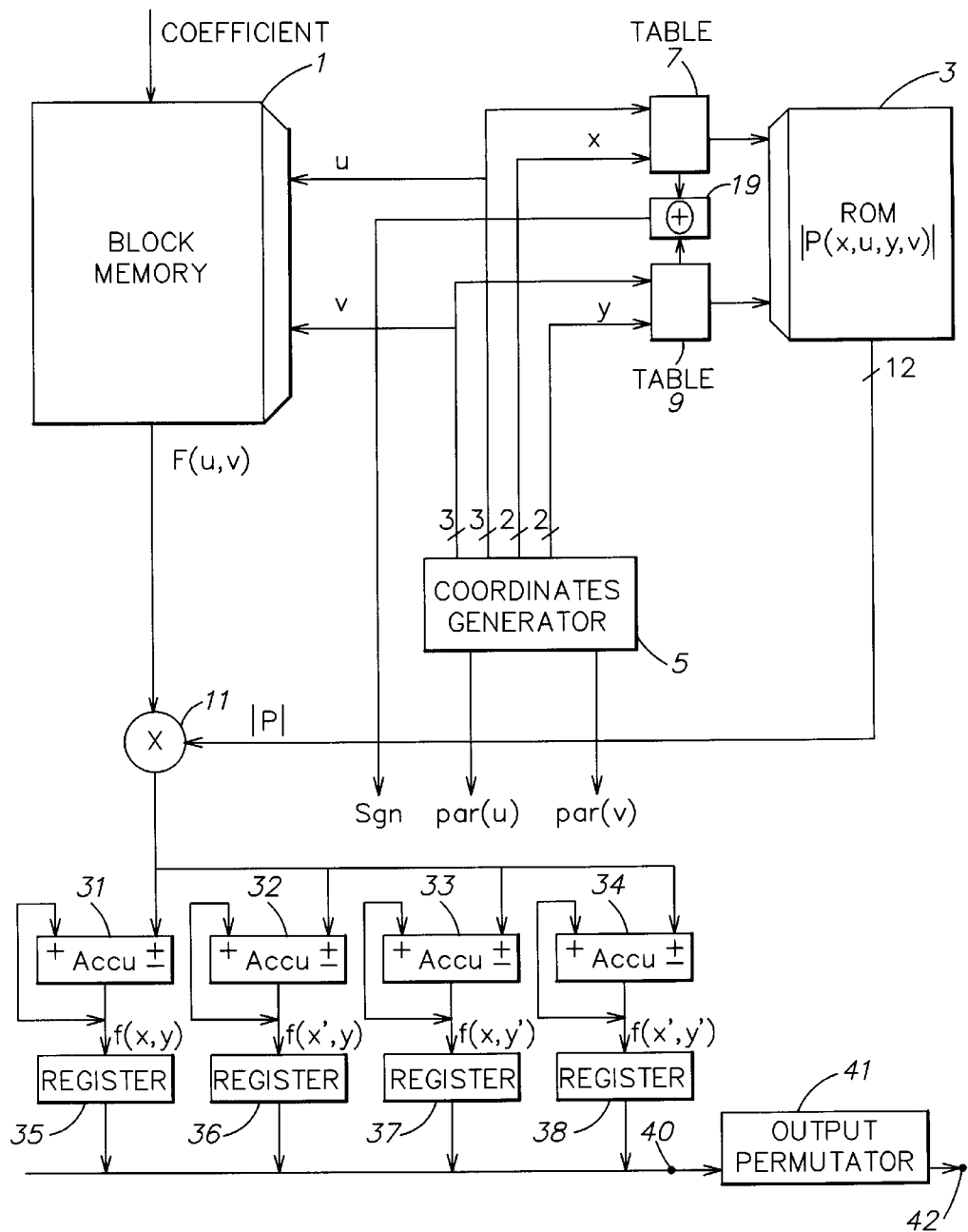
FIG. 5 shows a circuit for determining the reverse discrete cosine transform.

A circuit taking advantage of these relations is shown in FIG. 5.

In FIG. 5, elements similar to those of the previous figures are designated with same references. The circuit comprises a block memory 1 but, instead of blocks of pixels f(x,y), they now are blocks of coefficients F(u,v). As previously, ROM 3 contains values of P, that is, absolute values of products of cos(nπ/16), and is associated with a coordinate generator 5 and with tables 7 and 9 determining the value of terms n(x,u) and n(y,v). Multiplier 11 directly receives, on the one hand, the value F(u,v) from block memory 1 and, on the other, the value P from ROM 3. The result of the multiplication is simultaneously provided to four totalizers 31, 32, 33, 34 for which the addition or subtraction selection is determined as a function of the output Sgn from circuit 19 and parity values of u and v as supplied at the output of coordinate generator 5. The outputs of the four totalizers are simultaneously provided, and are temporarily stored in registers 35, 36, 37, 38 before being provided to an output line 40 at an appropriate rate.

However, the pixel outputs on line 40 are provided in a sequence imposed by the requirements of equations (17)–(20) above. That is, pixels corresponding to four positions arranged in pairs symmetrical with respect to the central axes of the pixel matrices are sequentially provided. This does not generally correspond to a desired scanning sequence of the pixel matrix. Therefore, it will be sometimes necessary to provide an output permutation circuit 41 for rearranging the pixels in a desired order on an output 42.

Additionally, as regards calculation of the reverse DCT, it will be noted that DCT operations are generally performed to subsequently quantify coefficients so as to transmit coefficients with the highest amplitude only. Thus, when the reverse transformation operation is to be made, one generally obtains matrices of coefficients F(u,v) in which most of the terms are null. Therefore, various methods can be used in order to avoid subjecting null coefficients to a calculation cycle by a circuit as shown in FIG. 1 or FIG. 5. This can be achieved, for example, by modifying the block memory and the coordinate generator as follows:

The block memory becomes a memory including a coefficient list. Non-null coefficients of a given block are stored therein at successive memory addresses in the form of a list of variable length. Each word of this memory contains, on the one hand, F(u,v), that is, the value of a coefficient and, on the other, coordinates (u,v) of this coefficient (3 bits each), and last a list-end bit fb.

The coordinate generator continues delivering x and y but the values of u and v are provided by the output of the block memory. Last, the block memory must be addressed so as to scan a list 64 times (in the example of FIG. 1) or 16 times (in the example of FIG. 5) before processing the next list.

Preferred Integrated Circuit Implementation

Figure 6:
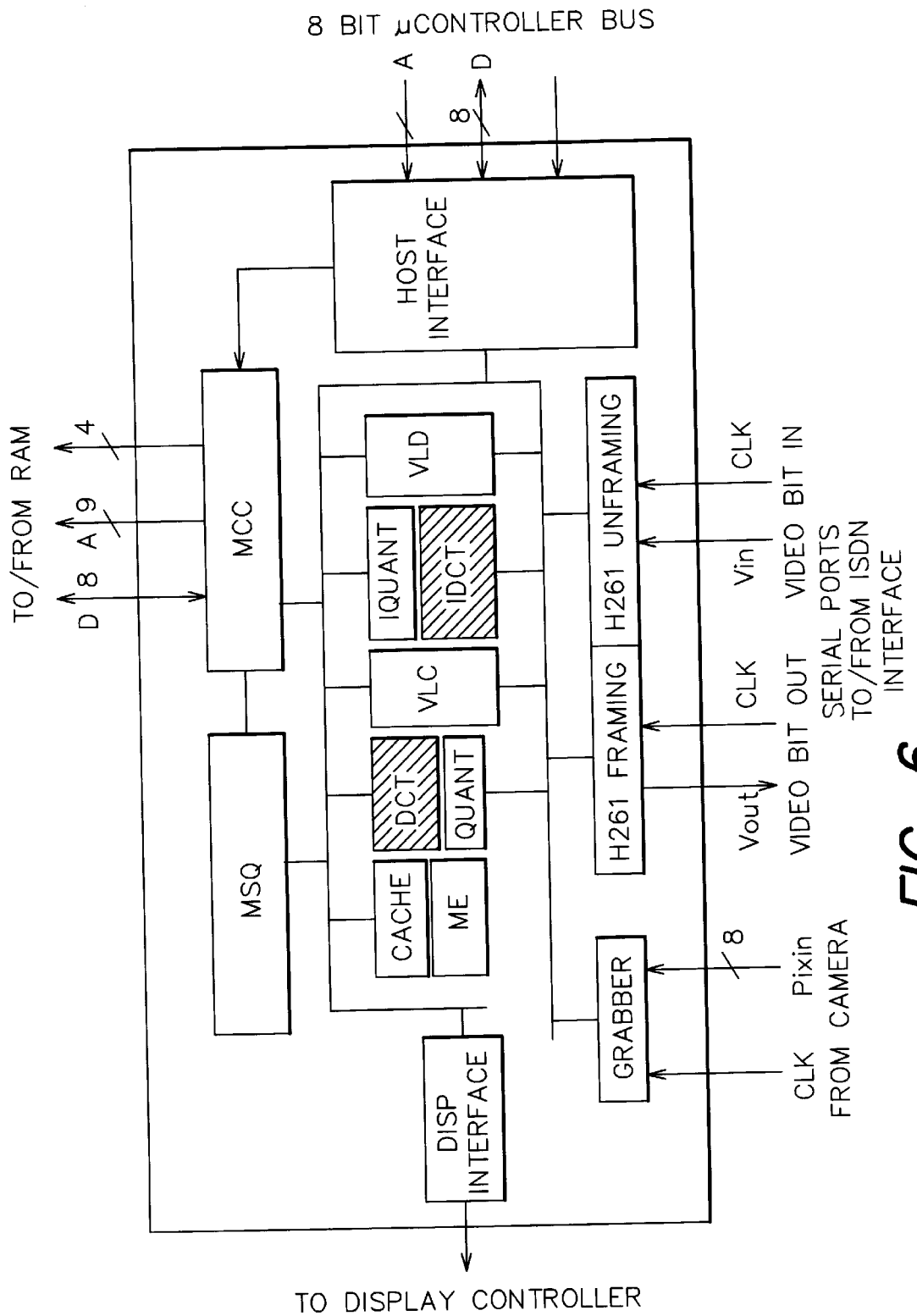
FIG. 6 shows the organization of the integrated circuit implementation of the presently preferred embodiment.

FIG. 6 shows the organization of the integrated circuit implementation of the presently preferred embodiment. In this sample embodiment, the DCT and the reverse DCT (called (IDCT) are performed on a single videocodec chip. This Videocodec chip performs the Coding, and simultaneously the Decoding, of a sequence of pictures for transmission at low bit rate (e.g. 48 to 128 Kbit/s). It is intended for use in a consumer Videophone.

There are many ways to architect a Videocodec. The described architecture was selected for its cost-effectiveness, but other designs might be more straightforward.

The Codec, in the presently preferred embodiment, holds a collection of dedicated processors, linked by a bus and working in a pipeline. The processors communicate through a external DRAM.

Coding Operations

The Grabber takes a digitalized video signal from a camera and stores pictures in memory.

The Motion Estimator reads in memory the grabbed blocks and searches for the best match within the previously reconstructed picture: This is the predictor.

The DCT processor subtracts the predictor from the grabbed block, accessed both in memory, then performs the transform. The resulting coefficients are quantized and written back to memory. The quantized coefficients are read in memory by 2 processors working in parallel:

The IDCT performs the reverse DCT; the Predictor is added after reverse quantization. The Reconstructed picture will provide predictors for the next picture.

The Variable Length Coder codes these coefficients according to the CCITT recommendation H261. The resulting string of bits is written back in memory, where they are read by the Framer. The Framer packs these bits with an error correcting code so that the resulting flow of bits can be transmitted over the network.

Decoding Operations

The Unframer receives a string of bits from the network, correct transmission error.

The Variable Length Decoder decodes these bits and outputs quantized coefficient. From then, the reconstruction by IDCT is exactly the same as for encoding. The IDCT and IQuant processors are shared by Coding and Decoding tasks.

The Multi Channel Controller ("MCC") handshakes with every processor. It arbitrates memory access, executes them and performs pointer incrementation. The MCC is a microprogrammed controller.

The Multi SeQuencer ("MSQ") provides management for the chip. It initializes channels and delivers a command to each processor for each block. This command tells how this block should be exactly cooked. The MSQ is a microprogrammed controller.

The MSQ cooperates with an external low cost, 8 bit microcomputer. This is used to configure the chip and control the bit rate.

Processor Local Control

Each processor has its local control, performed by a collection of cooperating state machines. In the case of DCT and IDCT, this is a 2 level control. Upper level interprets command from MSQ and handshakes with MCC.

For the operative parts which are at the core of the patent, the lower level is performed, 8×8 block after 8×8 block, by the "Coordinate Generator".

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

The disclosed innovative methods and circuits are particularly applicable to the discrete cosine transform. However, the disclosed innovations can also be adapted to other transforms, and particularly to other trigonometric transforms. including extensions of the cosine transform (i.e. to transforms which incorporate the operations of the 2-dimensional DCT combined with additional operations, e.g. to three-dimensional or complex transforms.)

Of course, the disclosed innovations can also be adapted to other block sizes, and may confer significant advantages.

While the presently preferred hardware embodiments are believed to be particularly advantageous in extracting maximum performance from a relatively low-cost integrated circuit design, it should be noted that the cost-effectiveness advantage of the disclosed innovations can also be employed to achieve higher resolutions and/or with higher-performance device techniques as these become available.

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. An electronic data processing method for performing a discrete cosine transform between a block of N×N data values f(x,y), representing an image, and a block of N×N transformed coefficients F(u,v), comprising sequential determination of individual ones of said coefficients F(u,v) by the steps of: for a first coordinate pair (x,y) of the data value:

(a) searching in a hardware table for the absolute value and the sign of a parameter P(x,u,y,v)=p(x,u)·p(y,v), where $p(x,u)=c(u)\cdot\cos\{(2x+1)\ u\pi/2N\}$ $p(y,v)=c(v)\cdot\cos\{(2y+1)v\pi/2N\}$ c(u), c(v)=1/√2 for u,v=0, and
c(u), c(v)=1 for u,v≠0;

(b) multiplying the absolute value of P by the data value f(x,y);

(c) introducing the result of the multiplication into an accumulator by addition or subtraction as a function of said sign;

repeating said steps (a)–(c) for each pair (x,y) in the block of data points;

extracting a total from said accumulator, and outputting a transformed value F(u,v); and employing the transformed value F(u,v) in video image processing.

2. The method of claim 1, wherein, during said step (a), values (u,v) are successively scanned in a zigzag pattern.

3. The method of claim 1, further comprising an additional step of buffering and reordering output values F(u,v).

4. The method of claim 1, wherein N=8.

5. A data processing method according to claim 1, wherein said searching step comprises the substeps of:

searching in a first hardware table addressed by x and u for the sign of p(x,u) and a term n(x,u) between 1 and N−1 inclusive such that p(x,u)=Sgn[p(x,u)]·|cos[n(x,u) π/2N]|;

searching in a second hardware table addressed by y and v for the sign of p(y,v) and term n(y,v) between 1 and N−1 inclusive such that p(y,v)=Sgn[p(y,v)]·|cos[n(y,v) π/2N]|; and searching in a third hardware table addressed by n(x,u) and n(y,v) for the absolute value of coefficient P.

6. The method of claim 5, wherein, during said step (a), values (u,v) are successively scanned in a zigzag pattern.

7. An electronic data processing method for performing a discrete cosine transform between a block of N×N data values f(x,y), representing an image, and a block of N×N transformed coefficients F(u,v), comprising sequential determination of individual ones of said coefficients F(u,v) by the steps of:

for a first set of four coordinate pairs (x,y), (x',y), (x,y'), and (x',y'), where x'=N−1−x and y'=N−1−y, performing the steps of:

(a) searching in a hardware table for the absolute value of a parameter P(x,u,y,v)=p(x,u)·p(y,v), where $$p(x,u)=c(u)\cdot\cos\{(2x+1)u\pi/2N\}$$

$$p(y,v)=c(v)\cdot\cos\{(2y+1)v\pi/2N\}$$

c(u), c(v)=1/√2 for u,v=0, and
c(u), c(v)=1 for u,v≠0;

(b) combining by addition and/or subtraction the four data values f(x,y), with a sign dependent on the relative position of each data point, to produce a combined value;

(c) multiplying the combined value produced by said step (b) by said value of coefficient P; and (d) introducing the result of said multiplication step (c) into an accumulator;

repeating said steps (a)–(d) for all values of coordinates x and y from 0 to (N/2)−1 inclusive;

extracting a total from said accumulator, and outputting a transformed value F(u,v) accordingly; and employing the transformed value F(u,v) in video image processing.

8. The method of claim 7, wherein, during said step (a), values (u,v) are successively scanned in a zigzag pattern.

9. The method of claim 7, further comprising an additional step of buffering and reordering output values F(u,v).

10. The method of claim 7, wherein N=8.

11. An electronic data processing method for performing a discrete cosine transformation on a block of N×N data values f(x,y), representing an image and being stored in a memory, to provide a corresponding block of N×N transformed coefficients F(u,v) such that $$F(u,v) = 1/K \sum_x \sum_y f(x,y)\cdot P(x,u,y,v)$$

where K is a constant, P(x,u,y,v)=p(x,u)p(y,v) and c(u), c(v)=1/√2 for u,v=0 and c(u), c(v)=1 for u,v≠0 and $$p(x,u) = c(u)\cdot\cos\left[(2x+1)\frac{u\pi}{2N}\right]$$
$$= \text{Sgn}[p(x,u)]\cdot\left|\cos\left[n(x,u)\frac{\pi}{2N}\right]\right|,$$

$$p(y,v) = c(v)\cdot\cos\left[(2y+1)\frac{v\pi}{2N}\right]$$
$$= \text{Sgn}[p(y,v)]\cdot\left|\cos\left[n(y,v)\frac{\pi}{2N}\right]\right|,$$

$$p(x,u) = c(u)\cdot\cos\left[(2x+1)\frac{u\pi}{2N}\right]$$
$$= \text{Sgn}[p(x,u)]\cdot\left|\cos\left[n(x,u)\frac{\pi}{2N}\right]\right|,$$

$$p(y,v) = c(v)\cdot\cos\left[(2y+1)\frac{v\pi}{2N}\right]$$
$$= \text{Sgn}[p(y,v)]\cdot\left|\cos\left[n(y,v)\frac{\pi}{2N}\right]\right|,$$

and n(x,u) or n(y,v) are integers limited to the range from 1 to N−1, comprising the steps of:

addressing and accessing a location in the memory;

providing the content of said location to a first input of a multiplier;

providing, in a first hardware table, absolute values of a parameter $$P = \cos\left[n(x,u)\frac{\pi}{2N}\right]\cdot\cos\left[n(y,v)\frac{\pi}{2N}\right];$$

for all values of parameters n(x,u) and n(y,v) from 1 to N−1, providing, in two second hardware tables, sign bits (Sgn[p(x,u)]) and address portions n(x,u);

reading out, from one said second table, the sign bit corresponding to (Sgn[p(x,u)]), and an address portion n(x,u);

reading out, from another said second table, the sign bit (Sgn[p(y,v)], and an address portion n(y,v);

addressing said first table at a location determined by said address portions n(x,u) and n(y,v), and reading out the absolute value of said parameter P accordingly;

using a clocked multiplier, multiplying at each clock pulse a data point value from said memory by a parameter P value of the said table;

cumulating a result of the multiplications by addition or subtraction as a function of said sign bits read out from said second tables for all values of coordinates x and y; and employing the cumulated result in video image processing.

12. The method of claim 11, wherein, during said reading out step, values (u,v) are successively scanned in a zigzag pattern.

13. The method of claim 11, further comprising an additional step of buffering and reordering output values F(u,v).

14. The method of claim 11, wherein N=8.

15. A DCT data processing circuit for making the correspondence between N×N data values f(x,y) and N×N coefficients F(u,v) according to the following relation:

$$F(u,v) = (1/K)\sum_{x=0}^{N-1}\sum_{Y=0}^{N-1} f(x,y)\cdot p(x,u)\cdot p(y,v)$$

where K is a constant power of 2,
x,y designate coordinates of the data values,
u,v designate coordinates of the coefficients F(u,v), $$p(x,u)=c(u)\cdot\cos[(2x+1)u\pi/2N]$$

$$p(y,v)=c(v)\cdot\cos[(2y+1)v\pi/2N]$$

c(u), c(v)=1/√2 for u,v=0=1 for u,v≠0,
the data processing circuit comprising:
 a data memory for storing data values having coordinates x and y;

$$P=|\cos[n(x,u)\pi/2N]\cdot\cos[n(y,v)\pi/2N]|$$

a first memory for storing values of with:

$$p(x,u)=\text{Sgn}[p(x,u)]\cdot|\cos[n(x,u)\pi/2N]|,$$

$$p(y,v)=\text{Sgn}[p(y,v)]\cdot|\cos[n(y,v)\pi/2N]|,$$

where n(x,u) and n(y,v) are integers ranging from 1 to N−1;
 a second memory for storing signs of p(x,u) and p(y,v) and for storing values of n(x,u) and n(y,v), the n(x,u) and n(y,u) values being used for addressing the first memory;
 a coordinate generator for sequentially providing value pairs (u,v) to the second memory and, for each pair (u,v), providing all the coordinates of the stored data to the data memory;
 a multiplier arranged to receive the P values from the first memory and receive the f(x,y) values from the data memory and constructed to calculate, for each coordinate x and y, a product of P and the data value from the data memory; and
 a totalizer subtracting from or adding to the product of the multiplication the previous product as a function of the sign provided by the second memory.

16. A circuit according to claim 15, wherein said data value is f(x,y).

17. A circuit according to claim 15, wherein said data value is $$f(x,y)+\text{par}(u)f(x',y)+\text{par}(v)[f(x,y')+\text{par}(u)f(x',y')]$$

where
 x'=N−1−x, y'=N−1−y, and par(u) and par(v)=+1 or −1 depending on whether u or v is an even or odd number.

18. A circuit according to claim 17, wherein said data value is provided by a circuit comprising a first adder/subtractor receiving f(x,y), f(x',y) and par(u) and providing f(x,y)+par(u)f(x',y), a second adder/subtractor receiving f(x,y'), f(x',y') and par(u) and providing f(x,y')+par(u)f(x',y') and a third adder/subtractor receiving the outputs of said first two adders and providing the result of the first plus the result of the second multiplied by par(v).

19. A circuit for processing data through a reverse discrete cosine transform making the correspondence between N×N coefficients (F(u,v)) and N×N data values (f(x,y)) according to the following relation:

$$f(x, y) = (1/K)\sum_{u}\sum_{v} F(u, v)\cdot c(u)\cdot\cos[(2x+1)u\pi/2N]\cdot c(v)\cdot\cos[(2Y+1)v\pi/2N]$$

where
 K is a constant power of 2,
 x,y designate the coordinates of the data values,
 u,v designate the coordinates of the coefficients F(u,v),
 c(u), c(v)=1/√2 for u,v=0=1 for u,v≠0,
the data processing circuit comprising:
 a coefficient memory for storing the coefficients F(u,v);
 a first memory for storing values of P=cos[n(x,u)π/2N]·cos[n(y,v)π/2N],
 where n(x,u) and n(y,v) are integers ranging from 1 to (N/2)−1;
 a second memory for storing signs of cos(n(x,u)π/2N) and cos(n(y,v)π/2N), and for storing values of n(x,u) and n(y,v);
 a coordinate generator for sequentially providing a pair of values (x,y) to the second memory, providing signals par(u) and par(v) equal to +1 or −1 depending on whether u and v are even or odd, and, for each pair (x,y), and providing all the values of pair (u,v);
 a multiplier arranged to receive the P values from the first memory and the F(u,v) coefficients from the coefficient memory, and constructed to calculate for each u and v, a product of P and F(u,v); and
 four totalizers for subtracting or adding the product of the multiplication from or to the previous product as a function of the sign provided by said sign table and of the values of par(u) and par(v) in order to respectively provide f(x,y), f(x',y), f(x,y') and f(x',y') where: x'=N−1−x y'=N−1−y.

20. A circuit according to claim 19, wherein said coefficient memory contains non-null coefficients only, and each word of said memory contains a non-null coefficient value followed by coordinates u, v of said coefficient.

* * * * *